(12) United States Patent
Koval et al.

(10) Patent No.: US 12,332,110 B2
(45) Date of Patent: *Jun. 17, 2025

(54) METHOD AND APPARATUS FOR DETERMINING A MASS OF A DROPLET FROM SAMPLE DATA COLLECTED FROM A LIQUID DROPLET DISPENSATION SYSTEM

(71) Applicant: BRIGHTON TECHNOLOGIES, LLC, Cincinnati, OH (US)

(72) Inventors: Richard David Koval, North Bend, OH (US); Guyrandy Jean-Gilles, Cincinnati, OH (US); Andrew Davison Gilpin, Mason, OH (US); Michael Anthony Geren, Mason, OH (US); Raymond Giles Dillingham, Cincinnati, OH (US); Timothy James Barry, Cincinnati, OH (US)

(73) Assignee: Brighton Technologies, LLC, Cincinnati, OH (US)

( * ) Notice: Subject to any disclaimer, the term of this patent is extended or adjusted under 35 U.S.C. 154(b) by 617 days.

This patent is subject to a terminal disclaimer.

(21) Appl. No.: 17/673,913

(22) Filed: Feb. 17, 2022

(65) Prior Publication Data

US 2022/0170776 A1 Jun. 2, 2022

Related U.S. Application Data

(63) Continuation of application No. 16/517,501, filed on Jul. 19, 2019, now Pat. No. 11,255,715.

(Continued)

(51) Int. Cl.
*G01G 9/00* (2006.01)
*G01P 3/36* (2006.01)

(52) U.S. Cl.
CPC . *G01G 9/00* (2013.01); *G01P 3/36* (2013.01)

(58) Field of Classification Search
CPC .................................. G01P 3/36; G01G 9/00
See application file for complete search history.

(56) References Cited

U.S. PATENT DOCUMENTS

| 5,186,057 A | 2/1993 | Everhart |
| 6,764,168 B1 | 7/2004 | Meinhold et al. |

(Continued)

FOREIGN PATENT DOCUMENTS

| CN | 1500635 A | 6/2004 |
| CN | 101500694 A | 8/2009 |

(Continued)

OTHER PUBLICATIONS

Sen, Abhishek; First Examination Report issued in IN Pat. App. No. 202127004490; Nov. 29, 2023; 6 pages.

(Continued)

*Primary Examiner* — Natalie Huls
(74) *Attorney, Agent, or Firm* — Frost Brown Todd LLP

(57) ABSTRACT

A method for operating a liquid droplet dispensation system is provided. The method includes dispensing a first droplet of a first fluid sample from a reservoir at a first pressure, measuring a first velocity of the first droplet, and measuring a first mass of the first droplet. The method further includes dispensing a second droplet of the first fluid sample from the reservoir at a second pressure, measuring a second velocity of the second droplet, and measuring a second mass of the second droplet. The method further includes dispensing a droplet of a second fluid sample from the reservoir at a third pressure, measuring a third velocity of the droplet of the second fluid sample, and determining a mass of the droplet (Continued)

of the second fluid sample based upon the first, second and third velocities, the first, second and third pressures, and the first and second masses.

16 Claims, 3 Drawing Sheets

Related U.S. Application Data

(60) Provisional application No. 62/701,061, filed on Jul. 20, 2018.

(56) References Cited

U.S. PATENT DOCUMENTS

| | | |
|---|---|---|
| 2009/0320568 A1 | 12/2009 | Desie et al. |
| 2011/0090275 A1 | 4/2011 | Govyadinov et al. |
| 2012/0274691 A1 | 11/2012 | Baldy, Jr. et al. |
| 2016/0067733 A1 | 3/2016 | Braginsky et al. |
| 2020/0324550 A1 | 10/2020 | Gracia Verdugo et al. |

FOREIGN PATENT DOCUMENTS

| | | | |
|---|---|---|---|
| CN | 101687102 A | | 3/2010 |
| CN | 102439165 A | | 5/2012 |
| CN | 103118642 A | | 5/2013 |
| CN | 106061742 A | | 10/2016 |
| JP | 2002139370 A | | 5/2002 |
| JP | 2003094629 A | | 4/2003 |
| JP | 2004361234 A | | 12/2004 |
| JP | 2005043075 A | * | 2/2005 |
| JP | 2007326003 A | | 12/2007 |
| JP | 2012101377 A | | 5/2012 |
| JP | 2017109939 A | | 6/2017 |
| JP | 2018517895 A | | 7/2018 |
| WO | 2017151516 A1 | | 9/2017 |
| WO | 2018002651 A1 | | 1/2018 |

OTHER PUBLICATIONS

Bardet, Maude; Extended European Search Report including the Supplementary European Search Report and the European Search Opinion, issued in European Patent Application No. 19837649.3; Mar. 10, 2022; 7 pages.

Huo, Lei; Office Action, issued in ChinaPatent Application No. 201980060208.3; Apr. 8, 2022; 6 pages.

* cited by examiner

METHOD AND APPARATUS FOR DETERMINING A MASS OF A DROPLET FROM SAMPLE DATA COLLECTED FROM A LIQUID DROPLET DISPENSATION SYSTEM

REFERENCE TO RELATED APPLICATION

This application is a continuation of U.S. patent application Ser. No. 16/517,501, filed Jul. 19, 2019, entitled Method and Apparatus for Determining a Mass of a Droplet from Sample Data Collected from a Liquid Droplet Dispensation System which claims priority of U.S. provisional patent application Ser. No. 62/701,061, entitled Apparatus and Method for Detection of Bubbles, filed Jul. 20, 2018, and hereby incorporates these applications by reference herein in their respective entireties.

TECHNICAL FIELD

A method for collecting sample data from a liquid droplet dispensation system is provided. The sample data is used to determine a mass of a droplet from the liquid droplet dispensation system without physically measuring the droplet.

BACKGROUND

Liquid deposition processes are used today for a wide range of applications and typically involve depositing a volume of liquid (e.g., a droplet) from a reservoir to a remote location. One example of such a liquid deposition process is a printing process, which involves ejecting a volume of liquid from a nozzle and to a specific location on a substrate. Another example of such a liquid deposition process is a combinatorial chemistry experiment, which involves depositing a precise volume of a liquid reagent into a cell to react with other reagents. Yet another example of such a liquid deposition process is a surface adhesion testing process, which involves depositing a volume of liquid onto a surface, and measuring the dimensions of the resulting drop of liquid on the surface to assess the wettability of the surface. These processes typically require precise control of the volume of deposited liquid and in some cases, such as for printing and surface adhesion testing, can also require control of the velocity of the liquid as it is being deposited.

Generally, these liquid deposition processes utilize a fluid deposition system that includes a reservoir of pressurized fluid and a valve associated with the reservoir. The valve is selectively opened or closed to dispense a desired volume of the pressurized fluid from the reservoir. The volume of the dispensed liquid is typically controlled by varying the applied pressure and the amount of time that the valve is opened. For a predefined valve cycle time (e.g., the amount of time that the valve remains opened), the volume of the fluid dispensed from the reservoir can be proportional to the dispensation velocity of the liquid. For example, the higher the velocity of the fluid that is dispensed from the reservoir for a predefined valve cycle time, the more volume of fluid will be dispensed therefrom. However, the volume of the dispensed liquid can also be influenced by the characteristics of the liquid (e.g., the viscosity), the mechanical characteristics of the system components (e.g., resistance to flow), and/or the compliance of the liquid deposition system.

The compliance of the liquid deposition system can be understood to be a measurement of the susceptibility of the components of the liquid deposition system to expand when under pressure. The expansion of the components can store mechanical energy, such that, when the valve is opened, the mechanical energy can be at least partially imparted into the pressurized fluid to encourage the dispensation of the liquid from the reservoir at a higher velocity than would be possible from the pressure alone. The velocity of the dispensed liquid therefore can also be a function of the compliance of the components of the system such that components with higher compliance (e.g., softer components) can generate a higher velocity than components with lower compliance (e.g., more rigid components).

The compliance of the liquid deposition system can also be affected by the presence of bubbles in the liquid deposition system (e.g., due to incomplete purging of the system or dissolved gases in the liquid). The bubbles have generally elastic properties such that when the liquid is under pressure, any bubbles present in the system can effectively store mechanical energy. When the valve is opened, the bubbles can release the stored energy thereby causing the fluid to be dispensed at a higher velocity than would be possible from the pressure alone. The amount of bubbles present in the fluid can be difficult to determine and the resulting change in the velocity and volume of the dispensed fluid can therefore be unpredictable, resulting in inaccuracy in the dispensation process.

BRIEF DESCRIPTION OF THE DRAWINGS

It is believed that certain embodiments will be better understood from the following description taken in conjunction with the accompanying drawings in which.

DETAILED DESCRIPTION

Figure 1:
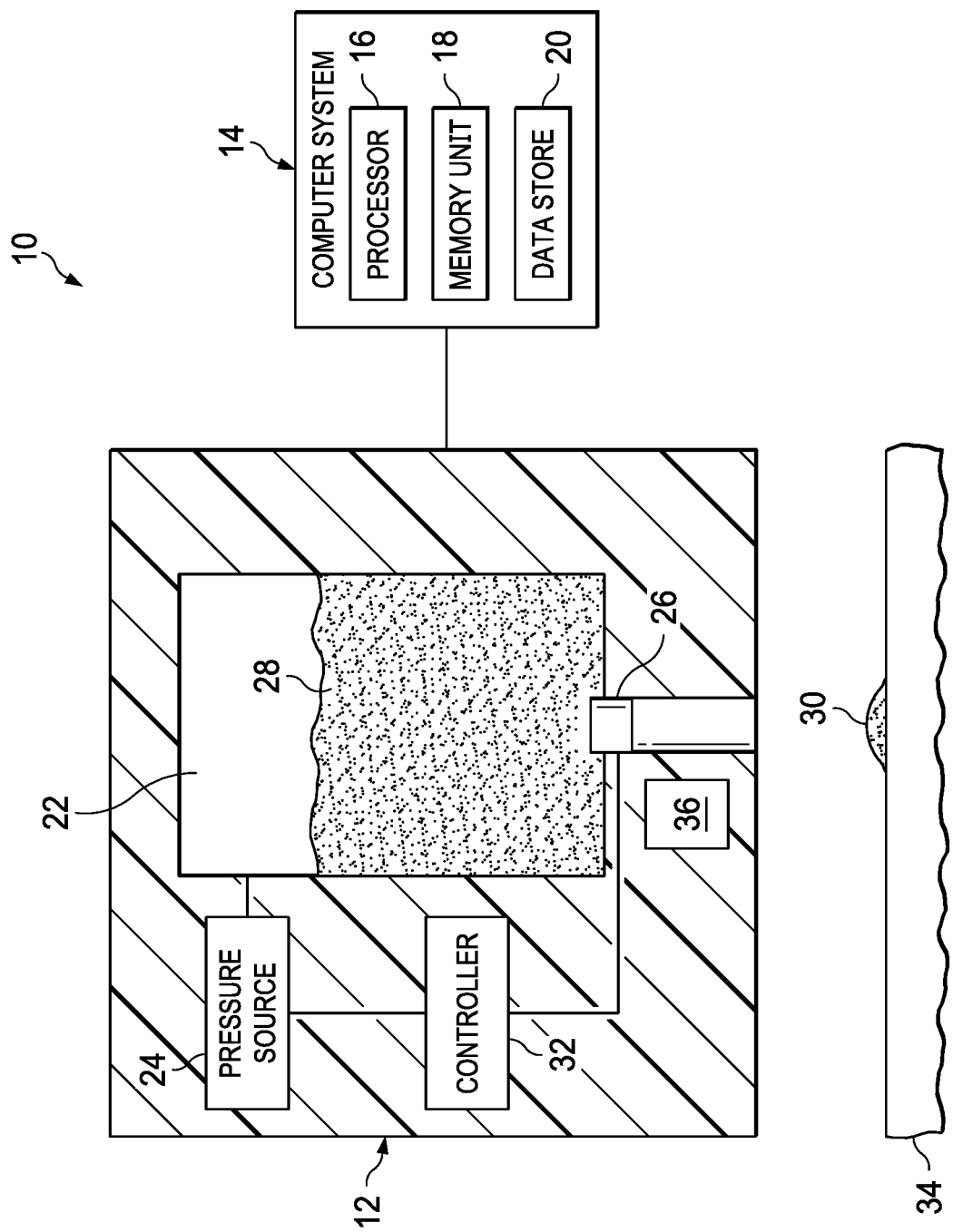
FIG. 1 is a schematic view depicting a liquid droplet dispensation system.

Various non-limiting embodiments of the present disclosure will now be described to provide an overall understanding of the principles of the structure, function, and use of the apparatuses, systems, methods, and processes disclosed herein. One or more examples of these non-limiting embodiments are illustrated in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment," or "in an embodiment" in places throughout the specification are not necessarily all referring to the same embodiment. Furthermore, the particular features, structures or characteristics may be combined in any suitable manner in one or more embodiments. In various embodiments disclosed herein, a single component can be replaced by multiple components and multiple components can be replaced by a single component to perform a given function or functions. Except where such substitution would not be operative, such substitution is within the intended scope of the embodiments.

Described herein are example embodiments of apparatuses, systems, and methods for collecting sample data from a liquid droplet dispensation system and using the sample data to determine a mass of a droplet without physically measuring the droplet.

The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

In general, it will be apparent to one of ordinary skill in the art that at least some of the embodiments described herein can be implemented in many different embodiments of software, firmware, and/or hardware. The software and firmware code can be executed by a processor or any other similar computing device. The software code or specialized control hardware that can be used to implement embodiments is not limiting. For example, embodiments described herein can be implemented in computer software using any suitable computer software language type, using, for example, conventional or object-oriented techniques. Such software can be stored on any type of suitable computer-readable medium or media, such as, for example, a magnetic or optical storage medium. The operation and behavior of the embodiments can be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Moreover, the processes described herein can be executed by programmable equipment, such as computers or computer systems and/or processors. Software that can cause programmable equipment to execute processes can be stored in any storage device, such as, for example, a computer system (nonvolatile) memory, an optical disk, magnetic tape, or magnetic disk. Furthermore, at least some of the processes can be programmed when the computer system is manufactured or stored on various types of computer-readable media.

It can also be appreciated that certain portions of the processes described herein can be performed using instructions stored on a computer-readable medium or media that direct a computer system to perform the process steps. A computer-readable medium can include, for example, memory devices such as diskettes, compact discs (CDs), digital versatile discs (DVDs), optical disk drives, or hard disk drives. A computer-readable medium can also include memory storage that is physical, virtual, permanent, temporary, semi-permanent, and/or semi-temporary.

A "computer," "computer system," "host," "server," or "processor" can be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein can include memory for storing certain software modules used in obtaining, processing, and communicating information. It can be appreciated that such memory can be internal or external with respect to operation of the disclosed embodiments. The memory can also include any means for storing software, including a hard disk, an optical disk, floppy disk, ROM (read only memory), RAM (random access memory), PROM (programmable ROM), EEPROM (electrically erasable PROM) and/or other computer-readable media. Non-transitory computer-readable media, as used herein, comprises all computer-readable media except for transitory, propagating signals.

A computer system in accordance with the present disclosure can be accessed via any suitable technique, such as a web-browser such as SAFARI, OPERA, GOOGLE CHROME, INTERNET EXPLORER, or the like, executing on a client device. In some embodiments, the systems and methods described herein can be a web-based application or a stand-alone executable. Additionally, in some embodiments, the systems and methods described herein can integrate with various types of computer systems, such as monitoring and control systems, and the like. Any suitable client device can be used to access, or execute, the computing system, such as laptop computers, desktop computers, smart phones, tablet computers, gaming system, and the like. Systems and methods described herein may generally provide a real time or near real-time monitoring environment. Interaction with the system may include, without limitation, keyboard entry, writing from pen, stylus, finger, or the like, with a computer mouse, or other forms of input (voice recognition, etc.). A dashboard or other metrics may be presented on a tablet, desktop, or the like.

Figure 2:
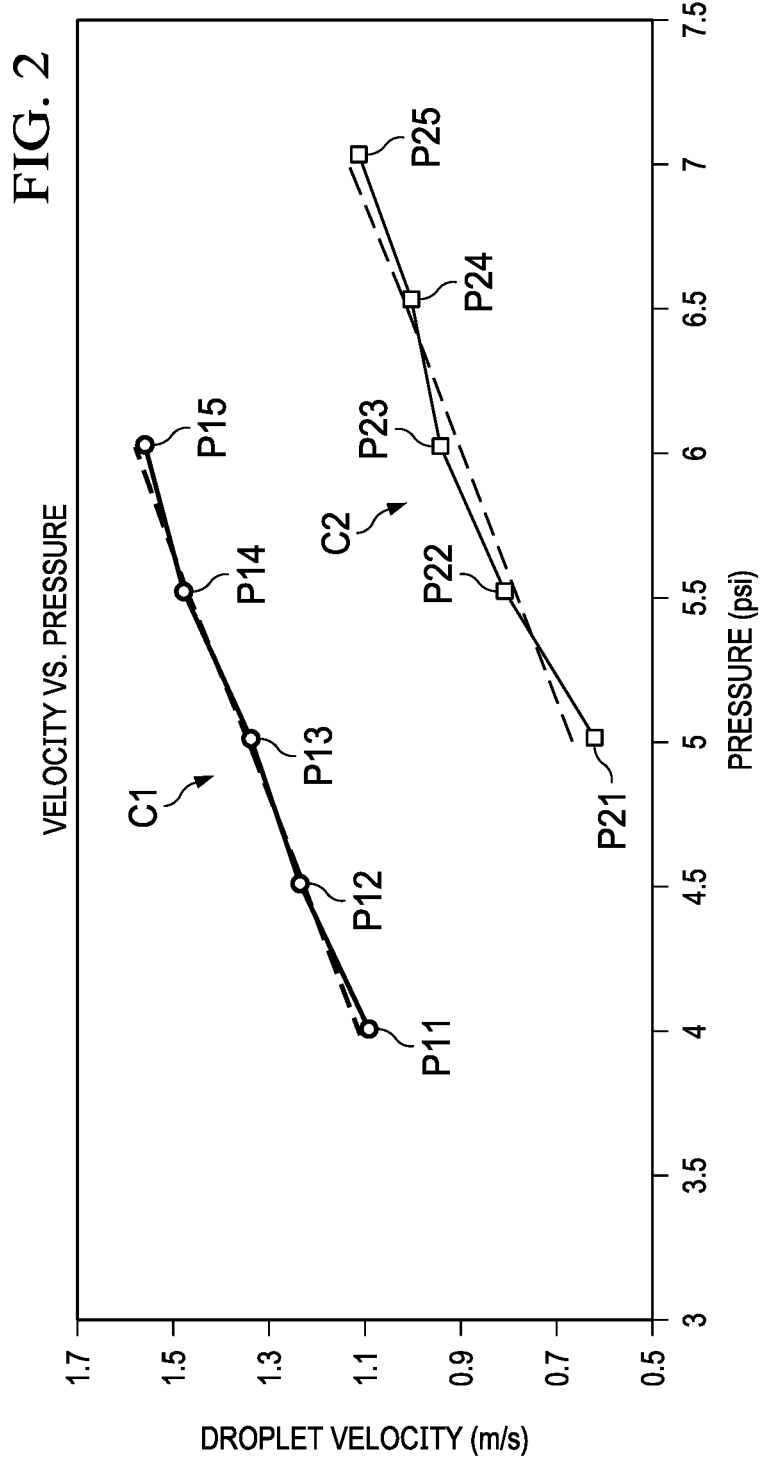
FIG. 2 is a plot of a pair of curves depicting a relationship between pressure and velocity of a droplet for different fluid samples tested in the liquid droplet dispensation system of FIG. 1.
Figure 3:
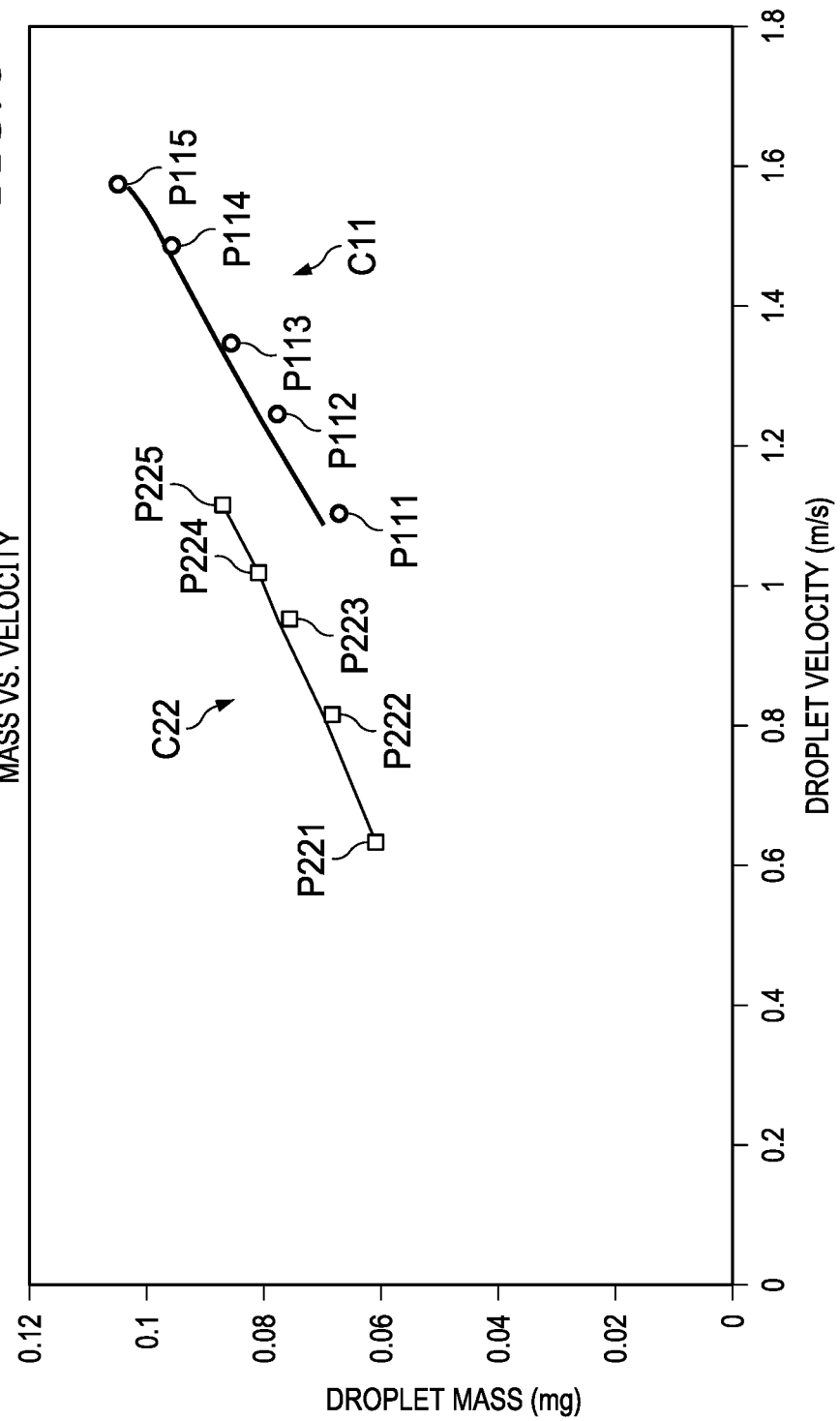
FIG. 3 is a plot of a pair of curves depicting a relationship between velocity and mass of a droplet for different fluid samples tested in the liquid droplet dispensation system of FIG. 1.

In connection with the views and examples of FIGS. 1-3, wherein like numbers indicate the same or corresponding elements throughout the views, FIG. 1 illustrates one embodiment of a testing system 10 that can be utilized to facilitate testing of a liquid droplet dispensation system 12 as described further herein.

The testing system 10 can include a computing system 14 that can be provided using any suitable processor-based device or system, such as a personal computer, mobile communication device, laptop, tablet, server, mainframe, or a collection (e.g., network) of multiple computers, for example. The computing system 14 can include one or more processors 16 and one or more memory units 18. For convenience, only one processor 16 and only one memory unit 18 are shown in FIG. 1. The processor 16 can execute software instructions stored on the memory unit 18. The processor 16 can be implemented as an integrated circuit (IC) having one or multiple cores. The computing system 14 can also utilize one or more Graphical Processing Units (GPU) to assist with various aspects of image processing. The memory unit 18 can include volatile and/or non-volatile memory units. Volatile memory units can include random access memory (RAM), for example. Non-volatile memory units can include read only memory (ROM), for example, as well as mechanical non-volatile memory systems, such as, for example, a hard disk drive, an optical disk drive, etc. The RAM and/or ROM memory units can be implemented as discrete memory ICs, for example.

The memory unit 18 can store executable software and data for use by the computing system 14 described herein. When the processor 16 of the computing system 14 executes the software, the processor 16 can be caused to perform the various operations of the computing system 14, such as collect sample data, generate data sets from the sample data, and determine a mass of a droplet from the sample data.

Data collected and used by computing system 14 can be stored at various sources, such as a data store 20, which can be a non-volatile computer memory, such as a hard disk drive, a read only memory (e.g., a ROM IC), or other types of non-volatile memory. In some embodiments, the data store 20 can be stored on a remote electronic computer system (e.g., cloud-based storage), for example. As is to be appreciated, a variety of other data stores, databases, or other types of memory storage structures, can be utilized or otherwise associated with the computing system 14.

The liquid droplet dispensation system 12 can include a reservoir 22, a pressure source 24 associated with the reservoir 22, and a valve 26 associated with the reservoir 22. The reservoir 22 can contain a fluid 28 and the pressure source 24 can be configured to selectively impart different pressures to the fluid 28 in the reservoir 22. In one embodiment, the pressure source 24 can be a pump. The valve 26 can be selectively actuated between a closed position and an opened position to facilitate dispensation of a droplet 30 of fluid from the reservoir 22 and onto a substrate 34. The pressure source 24 and the valve 26 can be associated with a controller 32 that is configured to control the pressure source 24 and the valve 26 to facilitate dispensation of the droplet 30 from the reservoir 22 onto the substrate 34. In one embodiment, the controller 32 can be an on-chip controller. The liquid droplet dispensation system 12 can include a velocity sensor 36 that is provided adjacent to the valve 26 and is configured to measure the velocity of the droplet 30 as it is dispensed from the valve 26 onto the substrate 34. In one embodiment, the velocity sensor 36 can comprise a chronograph that has a pair of light barrier beams that are spaced a known distance from each other. In such an embodiment, the velocity of the droplet 30 is measured based upon the elapsed time between the droplet 30 breaking the path of each of the light barrier beams.

In one embodiment, the liquid droplet dispensation system 12 can be a surface testing device that facilitates measuring of the wetting characteristics of a substrate. One example of such a surface testing device is disclosed in U.S. Pat. No. 8,272,254, which is incorporated by reference herein in its entirety. In another embodiment, the liquid droplet dispensation system 12 can be an inkjet printer. It is to be appreciated that any of a variety of suitable alternative liquid droplet dispensation systems are contemplated for the methods and processes described below.

It is to be appreciated that knowing the mass of the droplet 30 can be useful in certain liquid droplet dispensation systems. The fluid 28 used in the liquid droplet dispensation system 12, however, can inherently contain entrained air (e.g., microbubbles), which affects the ability to accurately predict the mass for a given pressure and the opening time of the valve 26. The amount of entrained air contained in the fluid 28 can be difficult to measure and/or control and can be different each time fluid is provided in the reservoir 22. As a result, the mass of a dispensed droplet can be difficult to predict without physically measuring the droplet 30, which can be difficult, and in some cases impossible, to accomplish during use of the liquid droplet dispensation system 12 in the field. A method for collecting sample data from the liquid droplet dispensation system 12 will now be discussed. The sample data can be useful in determining a mass of a droplet dispensed from the liquid droplet dispensation system 12 for fluids with different amounts of entrained air.

First, the reservoir 22 is filled with a first fluid sample (e.g., 28) that inherently contains an unknown amount of entrained air (e.g. which could be zero). A first pressure is applied to the first fluid sample via the pressure source 24 and a droplet (e.g., 30) is dispensed from the reservoir 22 by opening and closing the valve 26 for an elapsed time. The velocity of the droplet is measured with the velocity sensor 36 and the mass of the droplet is weighed. The pressure, velocity, and mass of the droplet is logged as a data point in the data store 20 of the computing system 14. A different pressure is then applied to the first fluid sample and a different droplet is dispensed from the reservoir 22 by opening and closing the valve 26 for the same (e.g., substantially the same) elapsed time as the previous droplet. The velocity of the droplet is measured with the velocity sensor 36 and the mass of the droplet is weighed. The pressure, velocity, and mass of the different droplet is logged as another data point for the first fluid sample in the data store 20 of the computing system 14. This process is then repeated for different pressures until a sufficient data set (e.g., a grouping) has been generated for the first fluid sample.

In one embodiment, the testing can be performed manually and manually logged into the computing system 14 (e.g., via a keyboard). In another embodiment, the testing can be automated by the computing system 14 such that the data set is automatically logged into the computing system 14 (e.g., via a communication interface).

The data set can be representative of the relationship between pressure, velocity, and droplet mass for the first fluid sample. FIG. 2 illustrates one example of a curve C1 that can be generated from the data set for the first fluid sample to illustrate the relationship between velocity and pressure for the first fluid sample. The curve C1 can be comprised of a variety of data points P11-P15 from the data set that are curve fit (or otherwise extrapolated) to generate the curve C1. FIG. 3 illustrates one example of a curve C11 that can be generated from the data set for the first fluid sample to illustrate the relationship between droplet mass and velocity for the first fluid sample. The curve C11 can be comprised of a variety of data points P111-P115 from the data set that are curve fit (or otherwise extrapolated) to generate the curve C11.

Once the testing on the first fluid sample is complete, the reservoir 22 is emptied and filled with a second fluid sample that also contains an unknown amount of entrained air. A pressure is applied to the second fluid sample and a droplet is dispensed from the reservoir 22. The velocity of the droplet is measured with the velocity sensor 36 and the mass of the droplet is weighed. The pressure, velocity, and mass of the droplet is logged as a data point for the second fluid sample in the data store 20 of the computing system 14. A different pressure is then applied to the second fluid sample, and a different droplet is dispensed from the reservoir 22 by opening and closing the valve 26 for the same (e.g., substantially the same) elapsed time as the previous droplet. The velocity of the droplet is measured with the velocity sensor 36 and the mass of the droplet is weighed. The pressure, velocity, and mass of the different droplet is logged as another data point for the second fluid sample in the data store 20 of the computing system 14. This process is then repeated for different pressures until a sufficient data set (e.g., a grouping) has been generated for the second fluid sample.

The data set can be representative of the relationship between pressure, velocity, and droplet mass for the second fluid sample. FIG. 2 illustrates one example of a curve C2 that can be generated from the data set for the first fluid sample to illustrate the relationship between velocity and pressure for the first fluid sample. The curve C2 can be comprised of a variety of data points P21-P25 from the data set that are curve fit (or otherwise extrapolated) to generate the curve C2. FIG. 3 illustrates one example of a curve C22 that can be generated from the data set for the first fluid sample to illustrate the relationship between droplet mass and velocity for the first fluid sample. The curve C22 can be comprised of a variety of data points P221-P225 from the data set that are curve fit (or otherwise extrapolated) to generate the curve C22.

It is to be appreciated that the process can be repeated for as many fluid samples, fluid types, and/or valve open times as desired to generate a complete collection of sample data for the liquid droplet dispensation system 12. Once the testing has been completed, the sample data (including any interpolated/extrapolated data) can be loaded onto the liquid droplet dispensation system 12 as comparative sample data as part of the commissioning process of the liquid droplet dispensation system 12. In one embodiment, the comparative sample data can comprise a lookup table.

During operation of the liquid droplet dispensation system 12 in the field, each droplet can be dispensed from the liquid droplet dispensation system 12 at a particular pressure and valve open time. During dispensation of the droplet, the velocity of the droplet can be measured by the velocity sensor 36. The pressure, the valve open time, and the velocity of the droplet can then be compared against the comparative sample time to determine the mass of the droplet. In particular, the pressure, the valve open time, and the velocity of the droplet can be compared with each of the data points in the comparative sample data. The data point that has a pressure, valve open time, and velocity that most closely matches the pressure, the valve open time, and the velocity of the droplet can be identified, and the mass listed in the data point can be used as the mass for the droplet. The comparative sample data can accordingly be used to determine the mass of the droplet more accurately than conventional arrangements and without requiring physical measurement of the droplet.

It is to be appreciated that the comparative sample data obtained from the liquid droplet dispensation system 12 can be deployed in other similar liquid droplet dispensation systems during manufacturing to allow each of the liquid droplet dispensation systems to use the comparative sample data in a similar manner.

The foregoing description of embodiments and examples of the disclosure has been presented for purposes of illustration and description. It is not intended to be exhaustive or to limit the disclosure to the forms described. Numerous modifications are possible in light of the above teachings. Some of those modifications have been discussed and others will be understood by those skilled in the art. The embodiments were chosen and described in order to best illustrate the principles of the disclosure and various embodiments as are suited to the particular use contemplated. The scope of the disclosure is, of course, not limited to the examples or embodiments set forth herein, but can be employed in any number of applications and equivalent devices by those of ordinary skill in the art. Rather it is hereby intended the scope of the invention be defined by the claims appended hereto. Also, for any methods claimed and/or described, regardless of whether the method is described in conjunction with a flow diagram, it should be understood that unless otherwise specified or required by context, any explicit or implicit ordering of steps performed in the execution of a method does not imply that those steps must be performed in the order presented and may be performed in a different order or in parallel.

What is claimed is:

1. A method for operating a liquid droplet dispensation system comprising a reservoir, the method comprising:
    dispensing a first droplet of a first fluid sample from the reservoir at a first pressure;
    measuring a first velocity of the first droplet during dispensation at the first pressure;
    measuring a first mass of the first droplet;
    dispensing a second droplet of the first fluid sample from the reservoir at a second pressure;
    measuring a second velocity of the second droplet during dispensation at the second pressure;
    measuring a second mass of the second droplet;
    dispensing a droplet of a second fluid sample from the reservoir at a third pressure;
    measuring a third velocity of the droplet of the second fluid sample during dispensation at the third pressure; and
    determining a mass of the droplet of the second fluid sample based upon the first velocity, the first pressure, the first mass, the second velocity, the second pressure, the second mass, the third pressure, and the third velocity.

2. The method of claim 1 wherein:
    the liquid droplet dispensation system further comprises a valve associated with the reservoir;
    dispensing the first droplet of the first fluid sample comprises opening the valve for a first predefined period of time;
    dispensing the second droplet of the first fluid sample comprises opening the valve for a second predefined period of time; and
    dispensing the droplet of the second fluid sample comprises opening the valve for a third predefined period of time, wherein the first predefined period of time, the second predefined period of time, and the third predefined period of time are substantially the same.

3. The method of claim 1 wherein the liquid droplet dispensation system further comprises a velocity sensor for measuring the first velocity, the second velocity, and the third velocity.

4. The method of claim 3 wherein the velocity sensor comprises a chronograph.

5. The method of claim 4 wherein the liquid droplet dispensation system comprises a surface testing device.

6. The method of claim 1 further comprising:
    identifying a first relationship between the first pressure, the first velocity, and the first mass for the first fluid sample; and
    identifying a second relationship between the second pressure, the second velocity, and the second mass for the first fluid sample, wherein determining the mass of the droplet of the second fluid sample is further based on the first relationship and the second relationship.

7. The method of claim 1 further comprising:
dispensing a first droplet of a third fluid sample from the reservoir at a fourth pressure;
measuring a fourth velocity of the first droplet of the third fluid sample during dispensation at the fourth pressure;
measuring a fourth mass of the first droplet of the third fluid sample;
dispensing a second droplet of the third fluid sample from the reservoir at a fifth pressure;
measuring a fifth velocity of the second droplet of the third fluid sample during dispensation at the fifth pressure;
measuring a fifth mass of the second droplet of the third fluid sample; and
determining the mass of the droplet of the second fluid sample based further upon the fourth velocity, the fourth pressure, the fourth mass, the fifth velocity, the fifth pressure, and the fifth mass.

8. The method of claim 7 wherein:
the liquid droplet dispensation system further comprises a valve associated with the reservoir;
dispensing the first droplet of the first fluid sample comprises opening the valve for a first predefined period of time;
dispensing the second droplet of the first fluid sample comprises opening the valve for a second predefined period of time;
dispensing the droplet of the second fluid sample comprises opening the valve for a third predefined period of time;
dispensing the first droplet of the third fluid sample comprises opening the valve for a fourth predefined period of time; and
dispensing the second droplet of the third fluid sample comprises opening the valve for a fifth predefined period of time, wherein the first predefined period of time, the second predefined period of time, the third predefined period of time, the fourth predefined period of time, and the fifth predefined period of time are substantially the same.

9. The method of claim 7 further comprising:
identifying a fourth relationship between the fourth pressure, the fourth velocity, and the fourth mass for the third fluid sample; and
identifying a fifth relationship between the fifth pressure, the fifth velocity, and the fifth mass for the third fluid sample, wherein determining the mass of the droplet of the second fluid sample is further based on the fourth relationship and the fifth relationship.

10. The method of claim 7 wherein the liquid droplet dispensation system further comprises a chronograph for measuring the first velocity, the second velocity, the third velocity, the fourth velocity, and the fifth velocity.

11. A method for collecting sample data from a liquid droplet dispensation system comprising a reservoir, the method comprising:
dispensing a droplet of a first fluid sample from the reservoir at a first pressure;
measuring a first velocity of the droplet of the first fluid sample during dispensation at the first pressure;
measuring a first mass of the droplet of the first fluid sample;
conducting further testing on the first fluid sample in a repeating pattern and in the following order:
dispensing a different droplet of the first fluid sample from the reservoir at a different first fluid sample pressure that is different from the first pressure;
measuring a velocity of the different droplet of the first fluid sample during dispensation at the different first fluid sample pressure; and
measuring a mass of the different droplet of the first fluid sample;
dispensing a droplet of a second fluid sample from the reservoir at a second pressure;
measuring a second velocity of the droplet of the second fluid sample during dispensation at the second pressure; and
determining a mass of the droplet of the second fluid sample based upon the first velocity, the first pressure, the first mass, each different first fluid sample pressure, the velocity of each different droplet of the first fluid sample, the mass of each different droplet of the first fluid sample, the second pressure, and the second velocity.

12. The method of claim 11 wherein:
the liquid droplet dispensation system further comprises a valve associated with the reservoir;
dispensing the first droplet of the first fluid sample comprises opening the valve for a first predefined period of time;
dispensing each different droplet of the first fluid sample comprises opening the valve for a second predefined period of time; and
dispensing the first droplet of the second fluid sample comprises opening the valve for a third predefined period of time, wherein the first predefined period of time, the second predefined period of time, and the third predefined period of time are substantially the same.

13. A liquid droplet dispensation testing system comprising:
a liquid droplet dispensation system comprising:
a reservoir configured to contain a fluid;
a pressure source configured to selectively impart different pressures to the fluid in the reservoir;
a valve associated with the reservoir and configured for selective actuation between a closed position and an opened position to facilitate dispensation of a droplet of fluid from the reservoir;
a velocity sensor that is provided adjacent to the valve and is configured to measure a velocity of the droplet as it is dispensed from the valve;
a controller associated with the pressure source and the valve and configured to:
operate the pressure source to facilitate pressurization of a first fluid sample in the reservoir to a first pressure, the first fluid sample having a first amount of entrained air contained therein;
operate the valve to facilitate dispensation of a first droplet of the first fluid sample from the reservoir at the first pressure;
operate the pressure source to facilitate pressurization of the first fluid sample in the reservoir to a second pressure;
operate the valve to facilitate dispensation of a second droplet of the first fluid sample from the reservoir at the second pressure;
operate the pressure source to facilitate pressurization of a second fluid sample in the reservoir to a third pressure; and operate the valve to facilitate dispensation of a droplet of the second fluid sample from the reservoir at the third pressure; and a computing system comprising one or more processors configured to:

measure a first velocity of the first droplet of the first fluid sample via the velocity sensor during dispensation at the first pressure;

measure a first mass of the first droplet of the first fluid sample;

measure a second velocity of the second droplet of the first fluid sample via the velocity sensor during dispensation at the second pressure;

measure a second mass of the second droplet of the first fluid sample;

measure a third velocity of the droplet of the second fluid sample via the velocity sensor during dispensation at the third pressure; and determine a mass of the droplet of the second fluid sample based upon the first velocity, the first pressure, the first mass, the second velocity, the second pressure, the second mass, the third pressure, and the third velocity.

14. The liquid droplet dispensation testing system of claim 13 wherein:

operating the valve to facilitate dispensation of the first droplet of the first fluid sample comprises opening the valve for a first predefined period of time;

operating the valve to facilitate dispensation of the second droplet of the first fluid sample comprises opening the valve for a second predefined period of time;

operating the valve to facilitate dispensation of the droplet of the second fluid sample comprises opening the valve for a third predefined period of time; and the first predefined period of time, the second predefined period of time, and the third predefined period of time are substantially the same.

15. The liquid droplet dispensation testing system of claim 13 wherein:

the one or more processors are further configured to identify a first relationship between the first pressure, the first velocity, and the first mass for the first fluid sample;

the one or more processors are further configured to identify a second relationship between the second pressure, the second velocity, and the second mass for the first fluid sample; and the mass of the droplet of the second fluid sample is further determined based upon the first relationship and the second relationship.

16. The liquid droplet dispensation testing system of claim 13 wherein:

the controller is further configured to:

operate the pressure source to facilitate pressurization of a third fluid sample in the reservoir to a fourth pressure;

operate the valve to facilitate dispensation of a first droplet of the third fluid sample from the reservoir at the fourth pressure;

operate the pressure source to facilitate pressurization of the third fluid sample in the reservoir to a fifth pressure; and dispense a second droplet of the third fluid sample from the reservoir at the fifth pressure; and the one or more processors are further configured to:

measure a fourth velocity of the first droplet of the third fluid sample via the velocity sensor during dispensation at the fourth pressure;

measure a fourth mass of the first droplet of the third fluid sample;

measure a fifth velocity of the second droplet of the third fluid sample via the velocity sensor during dispensation at the fifth pressure;

measure a fifth mass of the second droplet of the third fluid sample; and determine the mass of the droplet of the second fluid sample based further upon the fourth velocity, the fourth pressure, the fourth mass, the fifth velocity, the fifth pressure, and the fifth mass.

* * * * *